United States Patent
Herrmann et al.

(10) Patent No.: US 10,773,506 B2
(45) Date of Patent: Sep. 15, 2020

(54) CONTROLLED SILICONE RELEASE DURING XEROGRAPHIC PRINTING TO CREATE PRESSURE SENSITIVE ADHESIVE RELEASE COAT

(71) Applicant: XEROX CORPORATION, Norwalk, CT (US)

(72) Inventors: Douglas K Herrmann, Webster, NY (US); Santokh S Badesha, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 268 days.

(21) Appl. No.: 15/966,015

(22) Filed: Apr. 30, 2018

(65) Prior Publication Data
US 2018/0244028 A1    Aug. 30, 2018

Related U.S. Application Data

(62) Division of application No. 14/730,533, filed on Jun. 4, 2015, now Pat. No. 9,981,458.

(51) Int. Cl.
*B32B 37/10*    (2006.01)
*G03G 15/00*    (2006.01)
*B42D 5/00*    (2006.01)

(52) U.S. Cl.
CPC .............. *B32B 37/10* (2013.01); *B42D 5/00* (2013.01); *G03G 15/00* (2013.01); *G03G 15/6544* (2013.01); *G03G 15/6573* (2013.01); *G03G 2215/2093* (2013.01)

(58) Field of Classification Search
CPC .......... B32B 37/10; B42D 5/00; G03G 15/00; G03G 15/6544; G03G 15/6573
See application file for complete search history.

(56) References Cited

U.S. PATENT DOCUMENTS

| | | | |
|---|---|---|---|
| 5,198,476 A * | 3/1993 | Kobayashi | C08L 83/06 522/31 |
| 5,212,527 A | 5/1993 | Fromm et al. | |
| 5,666,592 A | 9/1997 | Aslam et al. | |
| 5,832,827 A * | 11/1998 | Pistro | B41J 2/325 101/288 |
| 5,887,235 A | 3/1999 | Wayman et al. | |
| 6,626,464 B1 * | 9/2003 | Flaherty | B42D 15/00 283/101 |

OTHER PUBLICATIONS

U.S. Appl. No. 14/530,859 to Douglas K. Herrmann; filed Nov. 3, 2014; and entitled Method and Apparatus for Inline Adhesive Signage.

* cited by examiner

*Primary Examiner* — Daniel McNally

(57) ABSTRACT

A process for applying a release agent and pressure sensitive adhesive to cut sheet media to thereby eliminate a separate release liner. A silicone oil plus additive release layer is applied during fusing on a top surface of cut media and then UV cured. A pressure sensitive adhesive layer is applied next. The cut sheets are then stacked and a compressive force is applied that transfers the pressure sensitive adhesive from one sheet to another and helps hold the stack together.

13 Claims, 2 Drawing Sheets

CONTROLLED SILICONE RELEASE DURING XEROGRAPHIC PRINTING TO CREATE PRESSURE SENSITIVE ADHESIVE RELEASE COAT

This is a divisional of U.S. application Ser. No. 14/730,533 filed Jun. 4, 2015, U.S. Publication No. 20160358520, by the same inventors, and claims priority therefrom. This divisional application is being filed in response to a restriction requirement in that prior application.

Cross reference is hereby made to commonly assigned U.S. Pat. No. 9,592,655 issued Mar. 14, 2017 to Douglas K. Herrmann; entitled METHOD AND APPARATUS FOR INLINE ADHESIVE SIGNAGE.

BACKGROUND

The present disclosure relates to applying an adhesive to signage for store shelving, and more particularly, to an improved method that applies a release coating to a multi-layered media substrate within a xerographic printing apparatus and applies an adhesive to the multi-layered media substrate after it exits the xerographic printing apparatus.

DESCRIPTION OF THE RELATED ART

Currently, the process being used to create adhesive signage for store shelving involves applying a PSA (pressure sensitive adhesive) tape to the paper or other substrate and then printing signs on the modified substrate. The tape involves an adhesive, a release liner and a backer which leads to problems, such as: running the taped media through a printer; glue build up in the printer; feed problems due to the uneven deformation of the stack; fuser Silicone oil being unevenly deposited on the modified substrate which then migrates to the rest of the system of the printer; concerns with the paper telescoping in roll form; and final stacking of the cards due to the height of the tape. The media is 0.008", and the adhesive tape is ~0.010" leading to a total thickness of roughly 0.018" on one side and 0.008" on the other. Additionally, at a store, the tape release liner must be removed and discarded as each of the ~5K to 7K signs are placed in aisles of the store. The cost of the tape used in this process is prohibitively high.

Additionally, other adhesive signage applications include the common post-it notes that are created on pretreated roll form systems and stacked with a secondary guillotine cutting operation to cut the shapes after stacking. A micro-sphere adhesive is added to the bottom of the sheet with a release agent treated top side opposite the adhesive. These systems use either blank or preprinted material in roll form on large dedicated roll fed systems. The micro-sphere adhesives used in their production are not suitable to refrigeration and freezer applications and do not stand up to in-store use for the time period required. In addition, this is not done in a cut sheet process and does not address robotic or other stacking of self-adhesive signage of different shapes, sizes with variable print data.

In the prior art, a dual mode oil applying blade for applying different oil rates depending on operating mode of an image creation apparatus is shown in U.S. Pat. No. 5,212,527, while a variable gloss fuser is disclosed in U.S. Pat. No. 5,666,592. Another variable gloss fuser is shown in U.S. Pat. No. 5,887,235.

Therefore, there is a need for an improved and less costly method and apparatus for applying an adhesive to signage for store shelving.

SUMMARY

In answer to this need and disclosed hereinafter is a unique process that applies a multi-layer media substrate in-line that has both the silicone release agent and the PSA applied to the simplex side of the media with the silicone release layer being added during the fusing process and the PSA being added post printing so the media can be more efficiently stacked, held together and then peeled and adhered to store shelving.

BRIEF DESCRIPTION OF THE DRAWINGS

Several of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
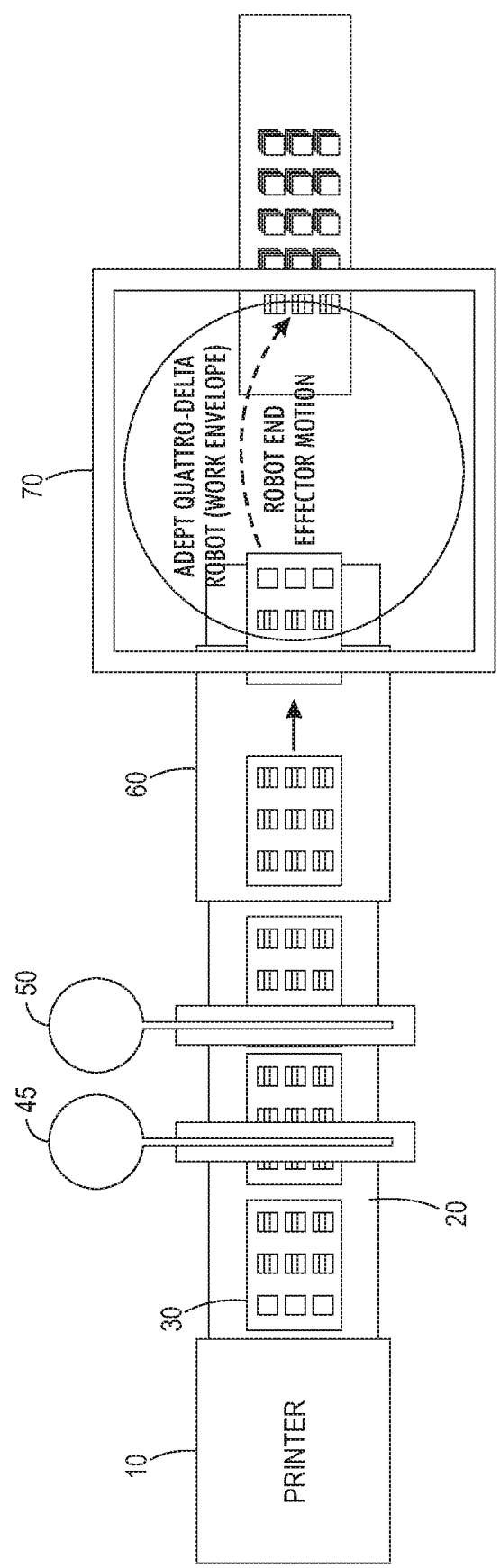
FIG. 1 is a schematic top view illustration of a process that creates multi-layered adhesive signage in-line with printer output.

For a general understanding of the features of the disclosure, reference is made to the drawings. In the drawings, like reference numerals have been used throughout to identify identical elements.

FIG. 1 is a schematic top view illustration of the process and apparatus in accordance with the present disclosure that creates multi-layered adhesive signage in-line with media output from printer 10. As is well known, in a conventional printer 10 an electrostatic latent image is created on a surface of an imaging member, such as, a photoreceptor. The latent image is developed by applying thereto a supply of toner particles, such as, with a developer roll which may be of any of various designs, such as, a magnetic brush roll or donor roll, as is familiar in the art. The toner particles adhere to appropriately-charged areas of the latent image. The surface of the photoreceptor is rotated to a transfer zone created by a transfer-detack device in the printer that is usually positioned in the six o'clock position.

At the transfer zone, the print sheet is brought into contact or at least in proximity with a surface of the photoreceptor, which at this point is carrying toner particles thereon. A corotron or other charge source causes the toner on photoreceptor to be electrically transferred to the print sheet. The print sheet is then sent to subsequent stations, as is familiar in the art, such as, a fuser and finishing devices, but in the present application is outputted onto conveyor belt 20.

Figure 2:
FIG. 2 is a schematic side view of a layered media that includes a pressure sensitive agent and a release agent applied thereto.

The signage creation process of the present disclosure in FIG. 1 eliminates the added tape used heretofore by building a layered substrate or card as shown in FIG. 2 that includes the media 30, a release agent or coating 40 and a PSA 50 designed for this application. As the media 30 in FIG. 2 exits printer 10 of FIG. 1, it is deposited onto conveyor belt 20.

Figure 3:
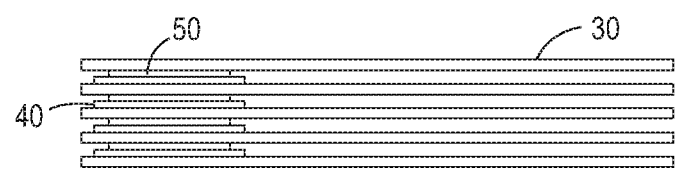
FIG. 3 is a schematic side view of layered media as shown in FIG. 2 in stack form.
Figure 4:
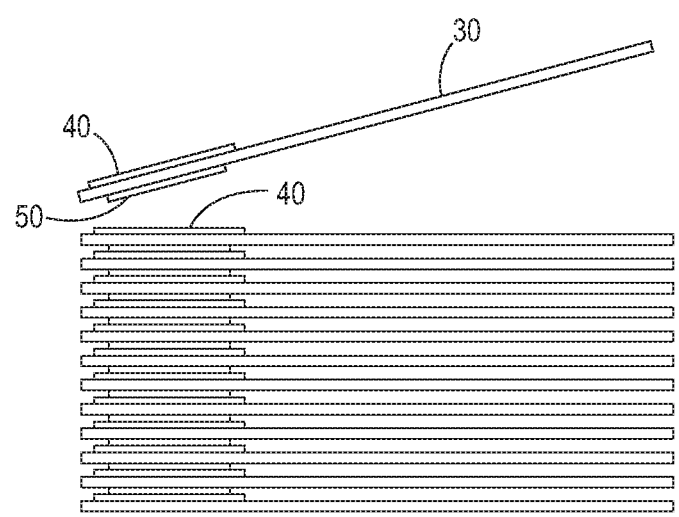
FIG. 4 is a side view of stacked adhesive signage with adhesive bonded to the bottom of the signage with a sheet being removed from the stack for a store shelf application.

In accordance with the present disclosure, a release coating 40 has been added to the top surface of the media during the fusing process within printer 10. That is, the silicone oil used in the fuser of printer 10 has been modified to include a release agent that is represented in FIG. 2 as coating 40. Release coating 40 is then UV cured or fixed at 45 to prepare for the addition of the next step which is to add a PSA 50 directly onto the release agent coating 40. The newly printed layered media (PSA Layer/Release Layer/Media) is then cut to size by a conventional laser 60 into cards/signage that is robotically stacked one on top of the other by a robotic system 70 that picks the cards up, places them into a stack and pressing the stack to create an adhesive stack as shown in FIG. 3. Each lower card in the stack will remain separated by the UV cured silicone release layer. By creating this layered matrix on cards 30 with a first Silicone UV cured layer and then a top layer of PSA, the cards can be made to be stacked and later peeled from each other as shown in FIG. 4. The PSA remains on the duplex uncoated side of the top card due to the marriage of the adhesive to the fibers of the paper and the silicone release layer remains on the top of the card below.

In practice, release agents 40 comprise fuser oil that includes silicone formulated with a pre-initiator component that crosslinks with a UV cure to initiate crosslinking in the silicone. The release agent or their mixtures can be picked from the list in the table below and will depend upon the type of fuser and release agent management system (RAM). For example, for color fusers that use donor roll based RAM, release agents of the Types 2 and 5 are used whereas for black and white fusers that use wick based RAM Type 1 and 3 are used. Type 4 release agents are used with wick based RAM for inkjet transfix systems.

TABLE 1

| Name | Structure | Mol % Functionality |
|---|---|---|
| Type 1 Pendant propylmercapto | [silicone structure with pendant -CH$_2$CH$_2$CH$_2$SH group] | (0.18-0.23% mercapto) |
| Type 2 Pendant propylamine | [silicone structure with pendant -CH$_2$CH$_2$CH$_2$NH$_2$ group] | (0.06-0.24% amine) |
| Type 3 Pendant N-(2-aminoethyl)-3-aminopropyl | [silicone structure with pendant -(CH$_2$)$_3$-NH-(CH$_2$)$_2$-NH$_2$ group] | (0.74-1.26% amine) |
| Type 4 Pendant tridecafluoro-octyl | [silicone structure with pendant -(CH$_2$)$_2$-(CF$_2$)$_5$-CF$_3$ group] | (2.0-6.0% Fluorine) |

TABLE 1-continued

| Name | Structure | Mol % Functionality |
|---|---|---|
| Type 5 Terminal propylamine | $\text{H}_3\text{C}-\underset{\underset{\underset{\underset{\text{NH}_2}{\mid}}{\overset{\mid}{\text{CH}_2}}}{\overset{\mid}{\underset{\text{CH}_2}{\mid}}}}{\overset{\overset{\text{CH}_3}{\mid}}{\text{Si}}}-\text{O}-(\underset{\overset{\mid}{\text{CH}_3}}{\overset{\overset{\text{CH}_3}{\mid}}{\text{Si}}}-\text{O})-$ | (0.05-0.107% amine) |

The UV light induced component of the composition include any one or their mixtures from SEMICOSIL® family available from Wacker Silicones, e.g., SEMICOSIL® 949 UV A/B, SEMICOSIL® 810 UV A/B, SEMICOSIL® 945 UV A/B, SEMICOSIL® 914 THIXO A/B, and SEMICOSIL® 912 UV A/B.

The silicone is added to the top of the sheet 30 during the fusing process before exiting the printer and is then quickly flash cured via UV at 45. PSA hot melt is then added directly to the top of release agent 40 in-line. The sheet 30 is then laser cut, guillotine cut, slit or die cut at 60 to produce sign shapes. Those shapes are then placed into stacks with a robotic system. One such system is an Adept Quattro 650 Robot made by Adept Technology, Inc., located at 5960 Inglewood Drive, Pleasant, Calif. 94588 to create ordered stacks in FIG. 4 that now become an adhered stack of signs. The stack is then pressed to allow the adhesive resident on the top release coat to migrate into the untreated/uncoated bottom of the card above. This migration of adhesive creates a marriage of the PSA into the media above. The adhesive continues to migrate and marry itself to the card above during storage and shipment to a store. At the store the signs are then peeled from the top with the adhesive adhering to the bottom of the top card and releasing from the card below due to the release agent layer as shown in FIG. 4.

In recapitulation, a process and apparatus has been disclosed that eliminates the pressure sensitive adhesive tape added to paper used heretofore by creating a multi-layer media substrate in-line that has both a release agent applied during fusing of images and a PSA applied post printing to the simplex side of the media so the media can be efficiently stacked, held together and then peeled and adhered to the store shelving.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process for applying a release agent and pressure sensitive adhesive to cut sheet media in-line with cut sheet media output from a printer, comprising;
   applying a silicone oil to a top surface of said cut sheet media before said cut sheet media exits said printer, said silicone oil including an additive release agent for coating said top surface of said cut sheet, said additive being capable of initiating crosslinking of said silicone oil and additive release agent coating to said top surface of said cut sheet media;
   exiting said cut sheet media from said printer;
   UV curing said silicone oil and additive release agent; and
   applying a pressure sensitive adhesive on top of said UV cured silicone oil and additive release agent.

2. The process of claim 1, including stacking said cut sheet media and applying a compressive force thereto that transfers said pressure sensitive adhesive from one cut sheet media to another.

3. The process of claim 2, including holding said cut sheet media together through said applying of said compressive force to said cut sheet media.

4. The process of claim 3, wherein said silicone oil and additive release agent is flash cured.

5. The process of claim 3, wherein said pressure sensitive adhesive bonds to a bottom surface of cut sheet media placed on top of said pressure sensitive adhesive.

6. The process of claim 2, wherein stacking of said cut sheet media forces said pressure sensitive agent positioned on said top surface of said cut sheet media to migrate into a bottom surface of cut sheet media positioned immediately thereabove.

7. The process of claim 1, including providing said printer with a fuser.

8. The process of claim 7, including providing said fuser with a fuser oil, and wherein said fuser oil includes said silicone oil and additive release agent.

9. The process of claim 8, including formulating said silicone oil and additive release agent with a pre-initiator component that crosslinks with said UV curing to initiate crosslinking in said silicone oil and additive release agent.

10. The process of claim 1, wherein said additive release agent includes a UV light induced component of any one of their mixtures from a group consisting of PDMS with vinyl and hydride functional groups+UV tracer; PDMS with vinyl+platinum; PDMS with vinyl and hydride functional groups; and PDMS with vinyl and hydride functional groups+silica.

11. A process for applying a release agent and pressure sensitive adhesive to substrates, comprising;
   providing a printer for placing images on substrates and outputting said substrates for downstream handling;
   applying a silicone plus additive release agent to top surfaces of said substrates for coating said top surfaces of said substrates before said substrates exit said printer, said additive being capable of initiating crosslinking of said silicone plus additive release agent coating to said top surfaces of said substrates;
   exiting said cut substrates from said printer;
   curing said silicone plus additive release agent; and applying a pressure sensitive adhesive on top of said cured silicone plus additive release agent.

12. The process of claim 11 including curing said silicone and additive release agent with ultraviolet light.

13. The process of claim 12, wherein said additive release agent includes a UV light induced component of any one of their mixtures from a group consisting of PDMS with vinyl and hydride functional groups+UV tracer; PDMS with vinyl+platinum; PDMS with vinyl and hydride functional groups; and PDMS with vinyl and hydride functional groups+silica.

\* \* \* \* \*